United States Patent
Xiong et al.

(10) Patent No.: US 9,521,470 B2
(45) Date of Patent: Dec. 13, 2016

(54) VIDEO DELIVERY SYSTEM CONFIGURED TO SEEK IN A VIDEO USING DIFFERENT MODES

(71) Applicant: HULU, LLC, Santa Monica, CA (US)

(72) Inventors: Tao Xiong, Beijing (CN); Zhibing Wang, Beijing (CN); Chenyang Cui, Beijing (CN); Cailiang Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 14/738,425

(22) Filed: Jun. 12, 2015

(65) Prior Publication Data

US 2015/0365736 A1 Dec. 17, 2015

Related U.S. Application Data

(60) Provisional application No. 62/011,938, filed on Jun. 13, 2014.

(51) Int. Cl.
| | |
|---|---|
| *H04N 21/845* | (2011.01) |
| *H04N 21/472* | (2011.01) |
| *H04N 21/234* | (2011.01) |
| *H04N 21/233* | (2011.01) |
| *H04N 21/6587* | (2011.01) |

(52) U.S. Cl.
CPC ........ *H04N 21/8456* (2013.01); *H04N 21/233* (2013.01); *H04N 21/23418* (2013.01); *H04N 21/47202* (2013.01); *H04N 21/47217* (2013.01); *H04N 21/6587* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,179,116 | B1 * | 11/2015 | Liao | H04N 9/87 |
| 2002/0051010 | A1 * | 5/2002 | Jun | G06F 17/30787 |
| | | | | 715/723 |
| 2007/0033515 | A1 * | 2/2007 | Sull | G06F 17/30796 |
| | | | | 715/202 |
| 2009/0100454 | A1 * | 4/2009 | Weber | G11B 27/28 |
| | | | | 725/9 |

\* cited by examiner

*Primary Examiner* — Mulugeta Mengesha
(74) *Attorney, Agent, or Firm* — Fountainhead Law Group P.C.

(57) ABSTRACT

Particular embodiments configure a video delivery system to provide different modes for seeking in a video. The different modes may segment the video on different boundaries based on different characteristics of the video. For example, the different modes may seek by scene, by shot, and by dialogue. The boundaries for scenes, shots, and dialogue may start the video on logical points that do not break up the flow of the video. In another embodiment, the media player may save a seek history for a user and allow the user to scan the previous seek requests to go back to the seek times of previous seek requests. In one embodiment, the previous seek times are adjusted via the boundary information to show thumbnails for a shot, scene, or dialogue that correspond to the boundaries in the video rather than the original seek time.

20 Claims, 15 Drawing Sheets

VIDEO DELIVERY SYSTEM CONFIGURED TO SEEK IN A VIDEO USING DIFFERENT MODES

CROSS REFERENCE TO RELATED APPLICATIONS

The present disclosure claims priority to U.S. Provisional App. No. 62/011,938, entitled "VIDEO BROWSING USING DIFFERENT MODES", filed Jun. 13, 2014, the contents of which is incorporated herein by reference in its entirety.

BACKGROUND

Users have many ways of viewing videos. For example, users can view videos via broadcast television or on-demand. The on-demand services allow a user to request a video at any time. The video may then be streamed to the user. Unlike broadcast TV where a live show cannot be fast-forwarded, a user may seek to any time in the on-demand video that the user is watching.

In one example, the user may seek to a future or previous time in the video. When a media player receives the seek request, the media player then delivers video at the seek time. Typically, a user may arbitrarily pick a time to seek to without exactly knowing what content is going to be played at that seek time. Thus, when the video starts playing based on the user's seek request, the context of what is happening in the video may be confusing to the user. For example, after seeking, the video may start in the middle of a line by an actor or actress in the video. This may cause the user to perform additional seek requests to start the video in a better position, which may be inconvenient for the user. Further, the user may seek to a point that the user may consider to be in a worse position in the video. In this case, the user has to try to find a previous seek time. Returning to the exact same time as a previous seek time is hard and often the user cannot find the exact time of a previous seek request.

SUMMARY

In one embodiment, a method includes: sending, by a computing device, a request for a video using a media player; receiving, by the computing device, a plurality of boundary information sets for the video, the plurality of boundary information sets segmenting the video differently based on different video characteristics; configuring, by the computing device, the media player to use the plurality of boundary information sets for seeking in the video; sending, by the computing device, requests for segments of the video; receiving, by the computing device, the segments for the video and playing the segments using the media player; receiving, by the computing device, a seek request for a seek time in the video; determining, by the computing device, a seek mode to use based on the seek time, wherein each seek mode is associated with one of the plurality of boundary information sets; determining, by the computing device, a segment in the video using the one of the plurality of boundary sets associated with the determined seek mode, wherein the segment starts at a different time than the seek time; and sending, by the computing device, a request for the segment, wherein the media player plays the segment in response to the seek request.

In one embodiment, a method includes: preprocessing, by a computing device, a video to determine a plurality of boundary information sets for the video, the plurality of boundary information sets segmenting the video differently based on different video characteristics; receiving, by the computing device, a request for the video from a client device; and causing, by the computing device, the plurality of boundary information sets to be sent to the client device, wherein the client device configures a media player to use the plurality of boundary information sets to perform seeks in the video, and wherein the media player plays the video, receives a seek request to a seek time in the video, and uses one of the plurality of boundary sets to determine a segment of the video to request for playback based on the seek time.

In one embodiment, an apparatus includes: one or more computer processors; and a non-transitory computer-readable storage medium comprising instructions, that when executed, control the one or more computer processors to be configured for: sending a request for a video using a media player; receiving a plurality of boundary information sets for the video, the plurality of boundary information sets segmenting the video differently based on different video characteristics; configuring the media player to use the plurality of boundary information sets for seeking in the video; sending requests for segments of the video; receiving the segments for the video and playing the segments using the media player; receiving a seek request for a seek time in the video; determining a seek mode to use based on the seek time, wherein each seek mode is associated with one of the plurality of boundary information sets; determining a segment in the video using the one of the plurality of boundary sets associated with the determined seek mode, wherein the segment starts at a different time than the seek time; and sending a request for the segment, wherein the media player plays the segment in response to the seek request.

The following detailed description and accompanying drawings provide a better understanding of the nature and advantages of particular embodiments.

DETAILED DESCRIPTION

Described herein are techniques for a video browsing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments configure a video delivery system to provide different modes for seeking in a video. The different modes may segment the video on different boundaries based on different characteristics of the video. For example, the different modes may seek by scene, by shot, and by dialogue. The boundaries for scenes, shots, and dialogue may start the video on logical points that do not break up the flow of the video.

Particular embodiments pre-process a video to determine different boundaries for the different seek modes. A boundary information set 114 for each mode is then sent to a client device that is playing a video via a media player. The media player can then use the boundary information sets 114 to process seek requests from a user. In one embodiment, the media player may dynamically switch between seeks modes automatically while playing the video. Also, a user may set a preferred mode of seeking.

In another embodiment, the media player may save a seek history for a user and allow the user to scan the previous seek requests to go back to the seek times of previous seek requests. In one embodiment, the previous seek times are adjusted via the boundary information to show thumbnails for a shot, scene, or dialogue that correspond to the boundaries in the video rather than the original seek time.

Pre-Processing of Videos

Before providing the seek modes at a media player, particular embodiments need to pre-process the videos. The pre-processing allows the video delivery system to provide a specialized computing device including a media player that uses different seek modes. Once the pre-processing is performed, then users may request videos and the different seek modes may be used by media players.

Figure 1:
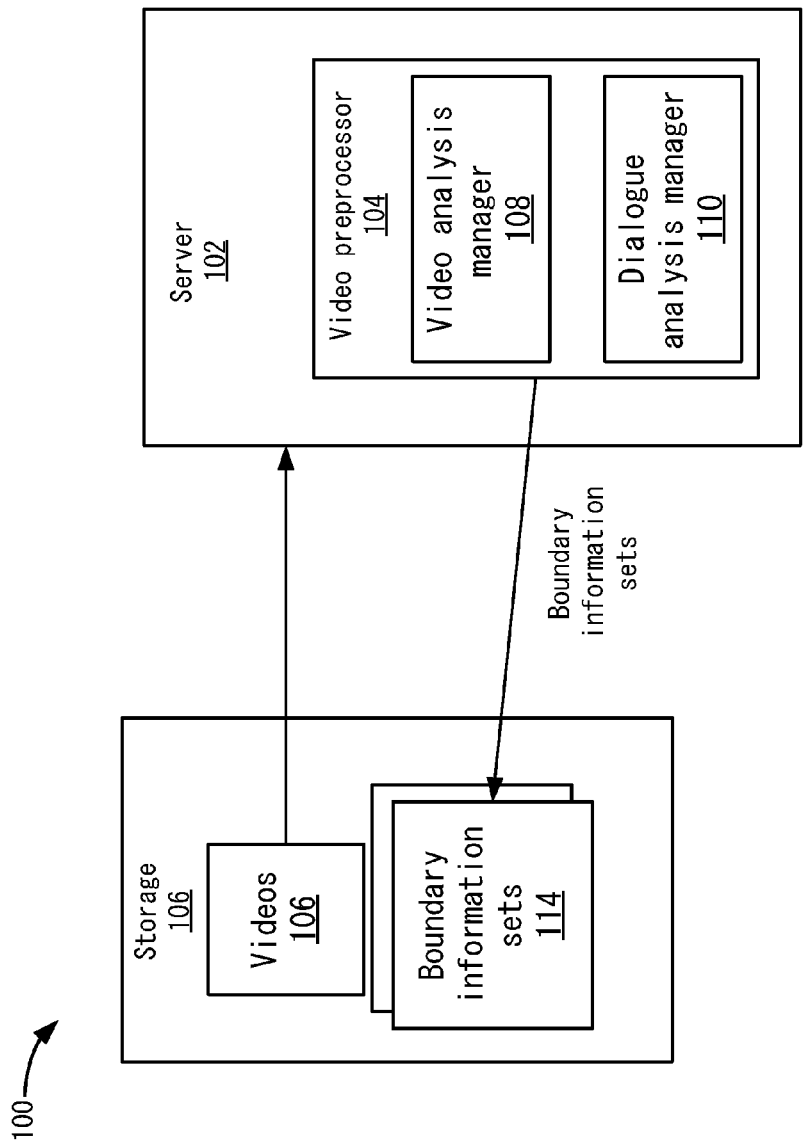
FIG. 1 depicts a simplified system for pre-processing videos according to one embodiment.

FIG. 1 depicts a simplified system 100 for pre-processing videos according to one embodiment. A server 102 includes a video pre-processor 104 that can pre-process videos stored in storage 106. In one embodiment, a video delivery service may provide on-demand access to a library of videos. Video pre-processor 104 may pre-process the videos in the library to determine boundary information sets 114 for each video or a portion of the videos.

Video pre-processor 104 receives a video and may analyze characteristics of the video using a video analysis manager 108 and/or a dialogue analysis manager 110. Video analysis manager 108 may analyze the video to determine boundaries in the video. The boundaries may include times in which a shot or a scene start or end, but other boundaries may also be determined, such as where ad transitions in the video occur. A shot boundary may be the first or last frame of a sequence of frames of the video that are recorded or rendered continuously from a particular camera or in the case of animation or virtual environments, an apparent or simulated camera. These sequences are commonly referred to as "a shot". For example, a shot may be one camera angle or a continuous shooting of a camera angle until a new camera angle is used in the video. A scene may be a continuous number of shots that go together to present a complete semantic unit until another scene occurs. A scene may transition to another scene using transitions, such as fade in and fade outs. Dialogue analysis manager 110 analyzes the dialogue in the video to determine boundaries in the dialogue. The dialogue may be the dialogue spoken by characters in the video. The boundaries may be when different characters in the video start or stop speaking, or each line spoken in the video.

Video analysis manager 108 may receive a video and perform various calculations to determine boundaries for different video characteristics, such as shots and scenes. For example, video analysis manager 108 may sample frames in the video to locate boundaries between two adjacent shots. Video analysis manager 108 may perform this analysis without any explicit definition of shot boundaries from associated metadata or other sources. In other embodiments, a definition of shot boundaries may also be received from other sources.

There may be several kinds of boundaries between two adjacent shots. Shot boundaries may generally be categorized into two types: abrupt transition (CUT) and gradual transition (GT). CUT is where there is a great change on the boundaries in the video. However, gradual transitions include less change than CUT boundaries, and are more commonly included in videos and are more difficult to detect. Considering the video characteristics of different editing effects, gradual transition may be further divided into dissolve, wipe, fade out/in (FOI), and so forth. Because there is a smooth transition from one shot to another, it may be difficult for an algorithm to automatically detect and/or decide the position of the shot boundary. In addition, it may be difficult to detect a difference between GT and fast movement in a single shot because the image variation from frame to frame may be substantial, but smooth in both cases.

Dialogue analysis manager 110 may analyze the dialogue in the video to determine boundaries based on the dialogue. For example, the boundaries may be based on characters' lines, such as a boundary may start when a first character starts speaking and the boundary may end when that first character stops speaking. A new boundary may start when a second character starts speaking and ends when the second character stops speaking. In another embodiment, each line spoken by any character may form boundaries. There may be times in which some characters are not speaking. These times may not be included in the boundaries. Or, in other cases, the dialogue boundaries may start when a first character starts speaking and then end when a new character starts speaking. When the new character starts speaking, a new boundary is started.

Dialogue analysis manager 110 may analyze the dialogue of the video, such as by automatic audio analysis or by analyzing captions in a caption file of the dialogue for the video. For example, dialogue analysis manager 110 may use speaker recognition to determine each character that is speaking in the video. In one example, the speech of a character is matched to a voice profile to determine which character is speaking. Also, the caption file may indicate in text which character is speaking. In either case, dialogue analysis manager 110 may be able to segment the dialogue of a video based on each character that is speaking, or by each line that is spoken.

Video analysis manager 108 and dialogue analysis manager 110 output boundary information sets 114 for the various characteristics that were analyzed. For example, a first boundary information set 114 contains boundaries for scenes; a second boundary information set 114 contains boundaries for shots; and a third boundary information set 114 contains boundaries for dialogue. The boundary information sets 114 may be a set of time stamps that indicate the start and/or end for the scenes, shots, or dialogue. This segments the video into segments. In one embodiment, these time stamps may be different from segments that a media player may request when playing the video regularly when not seeking. Using different time stamps may allow the media player to provide better context to a user in the video when the user seeks. This improves the functioning of the media player.

Figures 2A, 2B:
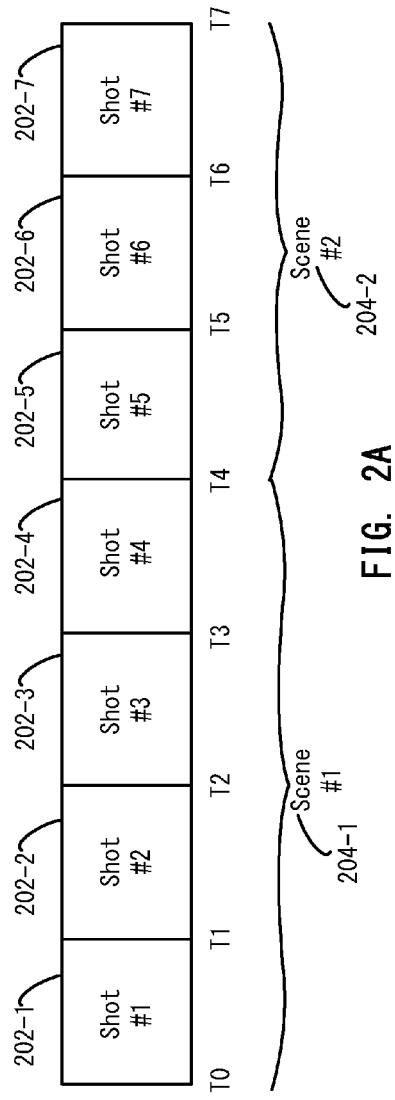
FIG. 2A depicts a conceptual example of a video according to one embodiment.
FIG. 2B shows the boundary information for shots and scenes in a table according to one embodiment.

FIG. 2A depicts a conceptual example of a video according to one embodiment. The video has been segmented into shots 202-1-202-7. The shots may include different numbers of video frames. For example, shot 202-1 may include 20 frames and shot 202-2 includes 25 frames. Shots 202 start and end at certain times. For example, shot 202-1 starts at time T0 and ends at time T1, and shot 202-2 starts at time T1 and ends at time T2. The other shots also start and end at different times.

Scenes may include multiple shots as discussed above. For example, a scene #1 204-1 includes shots 202-1-202-4. A scene #2 204-2 includes shots 202-5-202-7. Thus, scene 204-1 starts at time T0 and ends at time T4, and scene 204-2 starts at time T4 and ends at time T7.

The video delivery system uses different boundary information sets 114 for the video. FIG. 2B shows the boundary information sets for shots and scenes in a table 250 according to one embodiment. In a column 252, the shots are shown as shot #1, #2, #3, . . . , 7. A column 254 shows a start time and a column 256 shows the end time for each shot. At 257, shot #1 starts at time T0 and ends at time T1. The other shots also include similar boundary information.

A table 258 shows the boundary information for scenes. For example, a column 259 lists the scenes of scene #1 and scene #2. Also, a column 260 shows the start times of the scenes and a column 262 shows the end time of the scenes. As shown at 264, a scene #1 starts at time T0 and ends at time T4. Scene #2 also starts at time T4 and ends at time T7 in a row 266.

Figure 3:
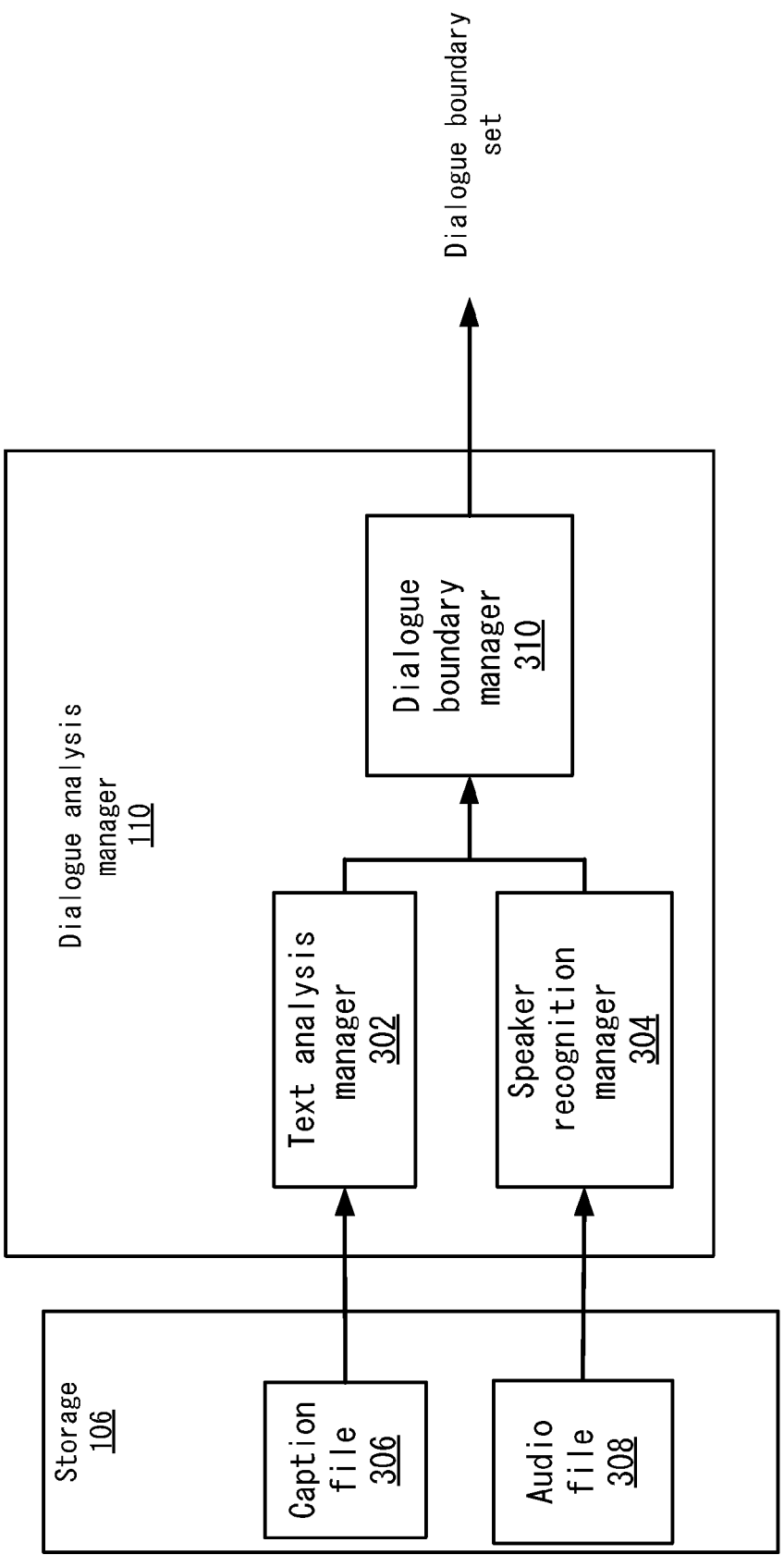
FIG. 3 depicts a more detailed example of a dialogue analysis manager according to one embodiment.

The above processing determined boundary information sets 114 for video. The following determines boundary information sets 114 for audio in the video. FIG. 3 depicts a more detailed example of dialogue analysis manager 110 according to one embodiment. Dialogue analysis manager 110 includes a text analysis manager 302 and a speaker recognition manager 304. Text analysis manager 302 receives a caption file 306 for the video. Caption file 306 may have been received with the video and created by a content source. In other cases, caption file 306 may be automatically generated by speech analysis/voice recognition. Text analysis manager 302 analyzes the captions to determine breaks in the dialogue, such as when characters start speaking and stop speaking or each line that a character speaks. Text analysis manager 302 then outputs the boundaries determined for the dialogue.

Speaker recognition manager 304 analyzes the speech in the video. In this case, an audio file 308 for the video may be received by speaker recognition manager 304. Speaker recognition manager 304 may then determine which characters are speaking from audio file 308. In this case, speaker recognition manager 304 may use profiles for characters in the video. The profiles may include information that allows speaker recognition manager 304 to identify who is speaking. Speaker recognition manager 304 then outputs the boundaries determined from the speaker recognition for the dialogue.

It should be noted that text analysis and speaker recognition may both be performed, or only one of the analyses may be performed. Dialogue boundary manager 310 analyzes the dialogue boundary information from text analysis manager 302 and/or speaker recognition manager 304. For example, dialogue boundary manager 310 may compare both results to determine the dialogue boundaries. In other examples, dialogue boundary manager 310 may use just one of the recognition methods. In one embodiment, dialogue boundary manager 310 may determine if there is a difference between dialogue boundaries and may flag the boundary for further analysis. In other cases, dialogue boundary manager 310 may select one of the dialogue boundaries from either the text analysis or speaker recognition that is deemed more accurate.

Figures 4A, 4B:
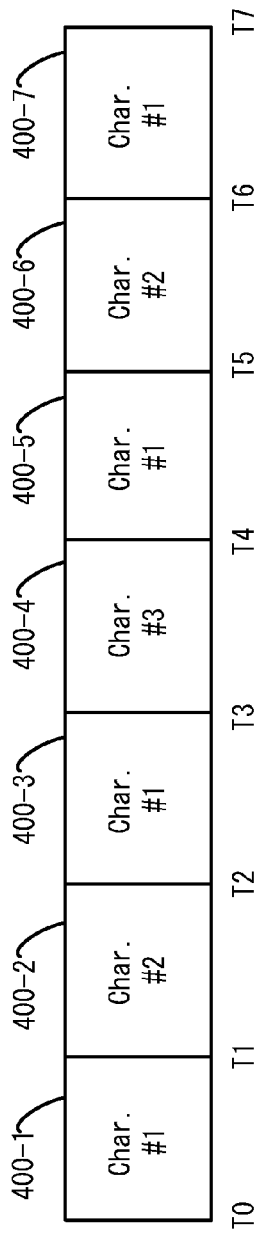
FIG. 4A shows a conceptual example of a dialogue according to one embodiment.
FIG. 4B shows an example of a table showing the boundary information set for dialogue according to one embodiment.

Once determining the dialogue boundaries, dialogue boundary manager 310 outputs a dialogue boundary information set 114. FIG. 4A shows a conceptual example of the video according to one embodiment. The dialogue is split for characters (Char.) #1, #2, and #3. For example, character #1 is speaking at 400-1, character #2 is speaking at 400-2, character #1 is speaking again at 400-3, character #3 is speaking at 400-4, character #1 is speaking again at 400-5, followed by character #2 at 400-6, and character #3 at 400-7. The segments may include any number of words and/or lines. Character #1 starts speaking at time T0 and stops speaking at time T1. Character #2 starts speaking at time T1 and stops speaking at time T2. This process continues as noted. It should also be understood that times T0-T7 may not be the same times as indicated for the shots and scenes as described above. For example, the dialogue described here may occur in a single shot, multiple shots, a scene, or other units.

FIG. 4B shows an example of a table 450 showing the boundary information set for dialogue according to one embodiment. A column 452 lists the character who is speaking; a column 454 indicates the time the character starts speaking; and a column 456 indicates the time the character stops speaking. As shown, at 458, a character #1 starts speaking at time T0 and stops speaking at time T1. At 460, a character #2 starts speaking at time T1 and stops speaking at time T2. At 462, character #1 starts speaking again at time T2 and stops speaking at time T3. The rest of the table also follows when the characters start and stop speaking as shown in FIG. 4A. It should be noted that different forms of table 450 may be appreciated. For example, all the stop and start times for character #1 may be on a single row. Many different configurations for storing the boundaries may be appreciated.

Table 450 may provide boundaries per character or per line. If the segmentation is by line, then each sentence may have boundaries associated with it rather than when characters start speaking and then stop speaking.

Video Delivery and Seek Processing

Figure 5:
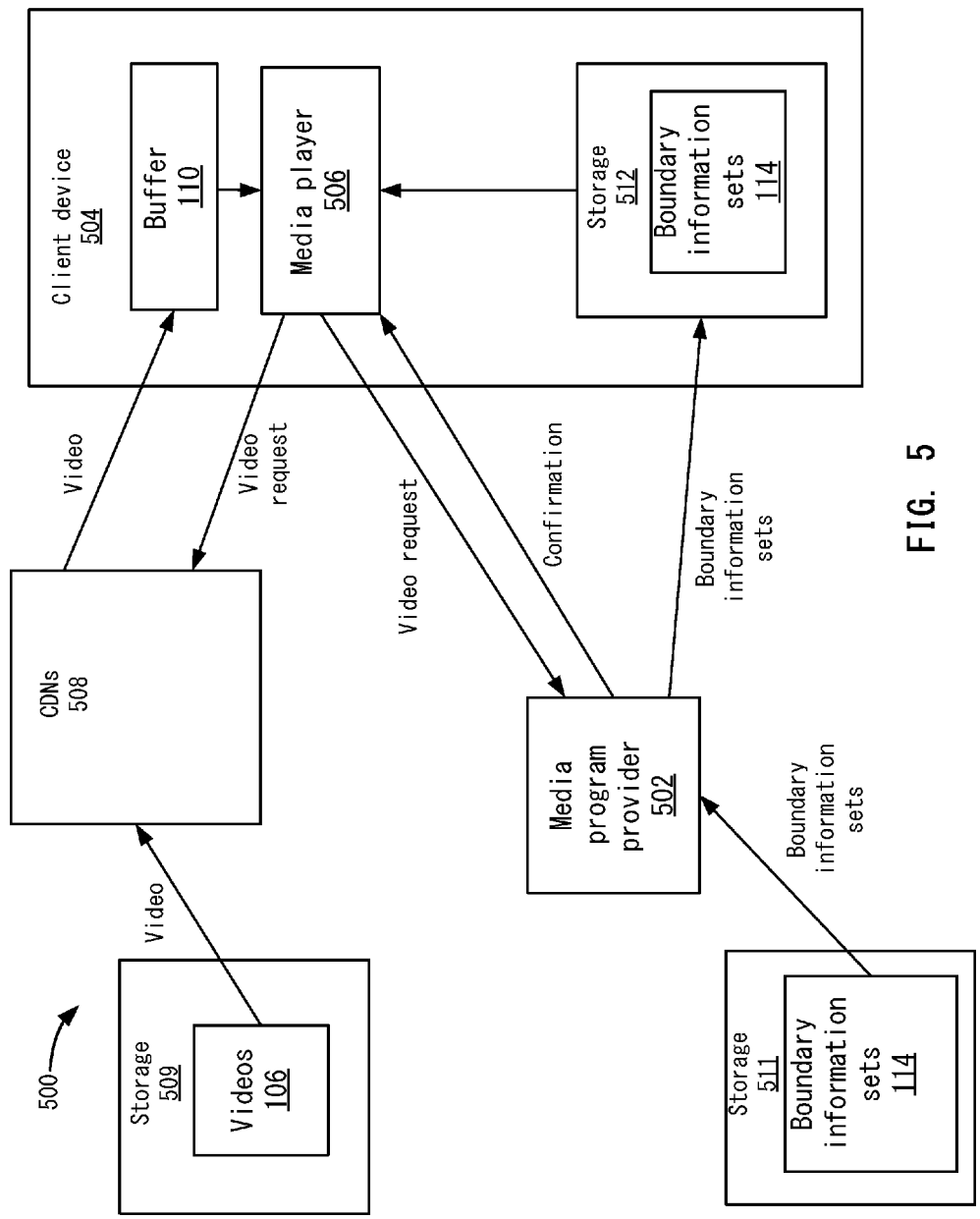
FIG. 5 depicts a simplified system for delivering videos according to one embodiment.

After pre-processing, the media player can be specifically configured to use the different seek modes while a video is being played. FIG. 5 depicts a simplified system 500 for delivering videos according to one embodiment. A media program provider 502 may provide a video delivery service that allows users to request videos in a library of videos on-demand. Media program provider 502 then provides the videos to a client device 504 for the user. A media player 506 may play the video. In one embodiment, the video may be provided via streaming technologies that allow a user to seek to different portions of the video.

In one embodiment, media program provider 502 may use content delivery networks (CDNs) 508 to deliver the videos to client devices 504. CDNs 508 may be associated with media program provider 502 or may be separate entities. If the CDNs are separate entities, then media program provider 502 may pay CDNs 508 to deliver the videos.

In one example, media player 506 may send a video request to media program provider 502. For example, a user may select a video and the video request sends a video identifier to media program provider 502. Media program provider 502 may then determine a CDN 508 to send the video to client device 504.

Media program provider 502 then sends a confirmation to media player 506 with information needed to retrieve the video. For example, the confirmation may include an identifier for the video and where to retrieve the video (e.g., CDN 508). Media player 506 then sends a request to CDN 508 for the video. In one embodiment, media player 506 sends requests for segments of the video. For example, media player 506 may send a request for the first segment, the second segment, and so on when playing the video from the beginning. During regular operation, media player 506 requests segments of the video in sequence. The segments requested may fall on set times in the video. These times may be different from times in the boundary information sets 114 for seeking. When client device 504 receives the segments of the video, client device 504 may store the segments of the video in a video buffer 510. Media player 506 reads the segments of the video out of video buffer 510 to play the video.

When sending the confirmation to media player 506, media program provider 502 may also retrieve boundary information sets 114 for the video from storage 511 and send boundary information sets 114 to client device 504. Client device 504 may then store the boundary information sets 114 in storage 512. Media player 506 can be specifically configured to boundary information sets 114 that are generated by the video delivery service because the video delivery service performs the pre-processing and also provides the specialized media player to play the video. In this way, the video delivery service controls both the video pre-processing and playing of the video. In some cases, not all videos may include boundary information sets. Media player 506 can determine which videos include the boundary information sets, such as by detecting flags or receiving control messages, and configure itself to use the boundary information sets when available.

Figure 6:
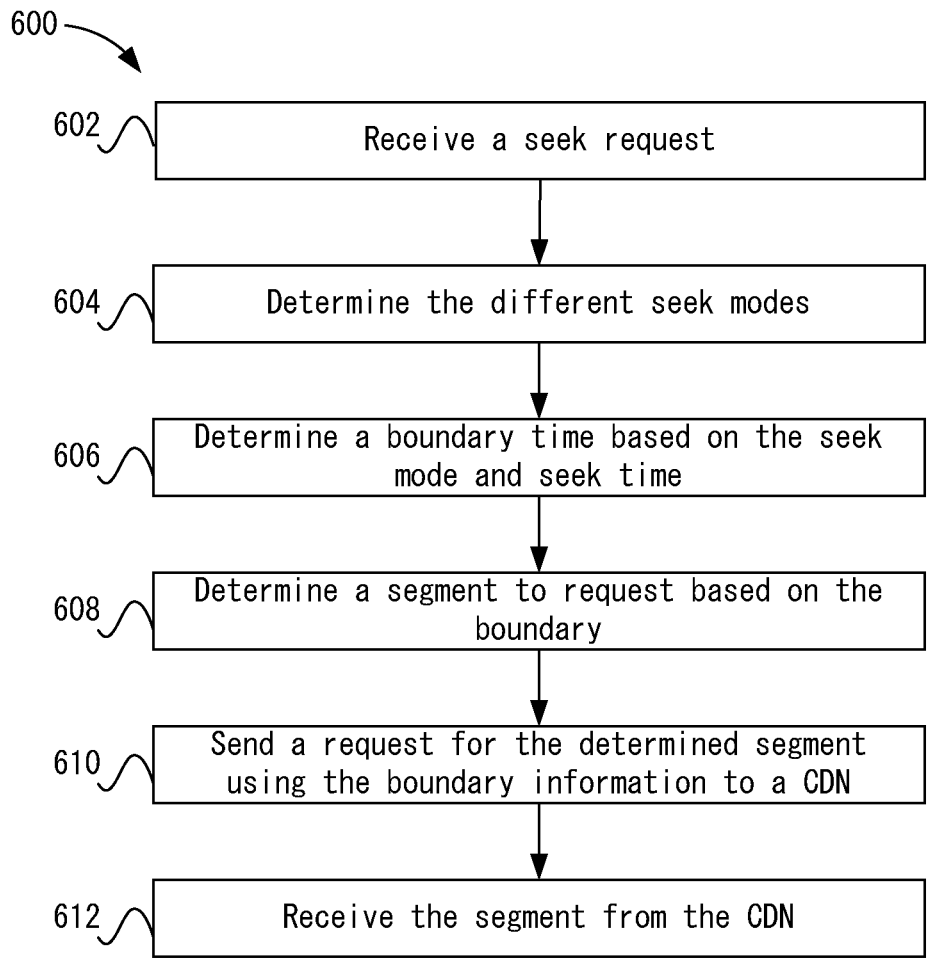
FIG. 6 depicts a simplified flowchart of a method for processing seek requests according to one embodiment.

At certain times after starting play of the video, a user can seek to a different position in the video. For example, a user may select a point on a progress bar in media player 506 to start the video at a different point. In other embodiments, a user may fast-forward or rewind the video using fast forward or rewind commands. FIG. 6 depicts a simplified flowchart 600 of a method for processing seek requests according to one embodiment. At 602, media player 506 receives a seek request. As discussed above, the seek request may request a seek time, which may be a time within the video that is not the time currently being played by media player 506.

At 604, media player 506 determines the different seek modes. As discussed above, the seek modes may include seeking based on different video characteristics, such as scene, shot, and dialogue. Media player 506 may determine the seek mode dynamically such as by analyzing the seek time and also other video characteristics, or a user may set the seek mode manually. Also, media player 506 may also determine whether the different seek modes are available by analyzing whether the boundary information sets have been received. If not, then the seek mode to request the frame nearest to the seek time may be used.

At 606, media player 506 determines a boundary time based on the seek mode and seek time. For example, if the seek time is at the 10 minute mark of the video, media player 506 may determine a boundary that is close to the 10 minute mark. Depending on the seek mode, media player 506 may determine the best boundary is a scene, shot, or dialogue (e.g., a line).

At 608, media player 506 determines a segment to request based on the boundary. For example, the boundary may indicate a time of 9:55. A segment starting at that time may then be requested. This segment starting time may correspond to a segment starting time that the media player would have requested while playing the media program without seeking. In other embodiments, media player 506 is specially configured to request a different time stamp for a segment when the seeking occurs.

Media player 506, at 610, sends a request for the determined segment using the boundary information to CDN 508. Then, at 612, media player 506 receives the segment from CDN 508. In this case, a user has selected a seek time at the 10 minute mark. This may be in between a shot or scene or character line. Media player 506 determines a better time to start the video. For example, if the video is started at the beginning of a scene that is close to the 10 minute mark, the user would have better understanding of the context of the video when watching the video from the beginning of the scene rather than starting the video in the middle of the scene. The same is true when starting from the beginning of a shot or the beginning of a dialogue line.

Media player 506 may use various algorithms to determine the seek mode. For example, the following algorithm may be used where a scene boundary (SCB), a shot boundary (SHB), and a dialogue boundary (DIB) are defined. A next shot boundary (NEXT SHB) is a next shot boundary right after the scene boundary. A next dialogue boundary (NEXT DIB) is the next dialogue boundary right after a shot boundary.

The following may use a rule-based method to determine the seek mode and position. In one example, the rules are designed such that media player 506 can perform the calculations in real-time or substantially in real-time. This allows the calculation to be made without noticeable delay to the user viewing the video. In the first rule, media player 506 determines if the seek time is within [SCB, MAX (SCB+1 MIN, NEXT SHB)]. This states that if the seek time is within the beginning of a scene boundary to the maximum of the scene boundary plus a time (e.g., one minute) to the next shot boundary, then, media player 506 starts from this scene boundary. This means that the seek time is close to the beginning of the scene boundary. If this is not true, then media player 506 determines if the seek time is within [SHB, MAX (SHB+20 seconds, NEXT DIB)]. This means that the seek time is within the beginning of the shot boundary plus a time (e.g., 20 seconds) or the next dialogue boundary. If this is the case, then media player 506 starts from the beginning of this shot boundary. This means that the seek time is close to the beginning of the shot boundary.

If the above is not true, then media player 506 may start from the nearest dialogue boundary before the seek time. In the above algorithm, media player 506 determines which boundary would provide the best context for the video when the video starts from the new boundary.

Figure 7:
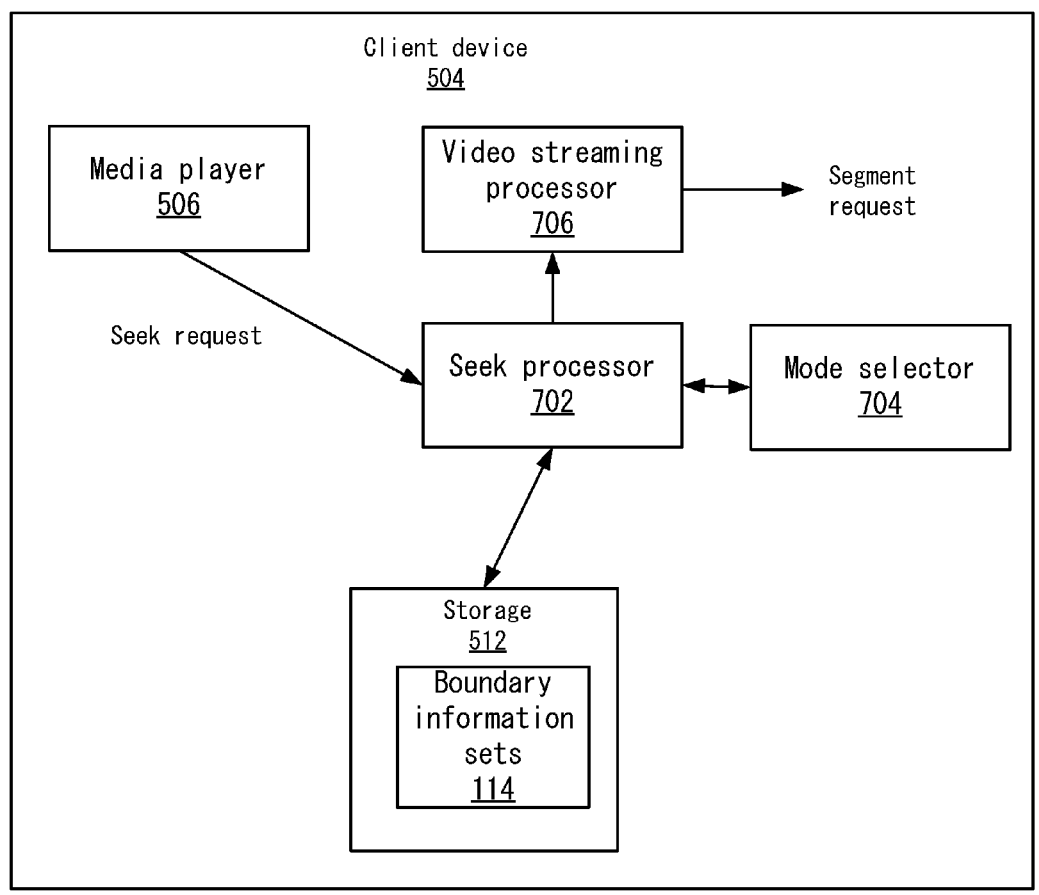
FIG. 7 depicts a more detailed example of a client device according to one embodiment.

Client 504 may be specially configured to perform seeking in different modes. FIG. 7 depicts a more detailed example of client device 504 according to one embodiment. Client device 504 includes a seek processor 702, mode selector 704, and a video streaming processor 706, where these components may be part of media player 506 or be implemented in specialized logic.

Seek processor 702 receives a seek request. Seek processor 702 may be coupled to media player 506 which sends the seek request to seek processor 702. Seek processor 702 can determine the seek time that the user requested. A mode selector 704 then uses the seek time to determine what mode to use. For example, mode selector 704 may perform the above algorithm to determine the seek time. In other embodiments, mode selector 704 may determine a setting for the seek mode that has been previously set either by a user or automatically.

Once determining the seek mode, seek processor 702 may determine the boundary to use. For example, seek processor 702 queries a boundary information set 114 in storage 512 for a boundary time. For example, based on whether a scene, shot, or dialogue boundary is being used, seek processor 702 determines which boundary is closest to the seek time. For example, if the scene mode is to be used, seek processor 702 analyzes the scene boundary information set 114 to determine a scene that is best for the seek time. Once receiving that time, seek processor 702 may send the time to video streaming processor 706. For example, a segment identifier may be sent to video streaming processor 706. Video streaming processor 706 can then request the segment via the time or the segment identifier.

Figure 8:
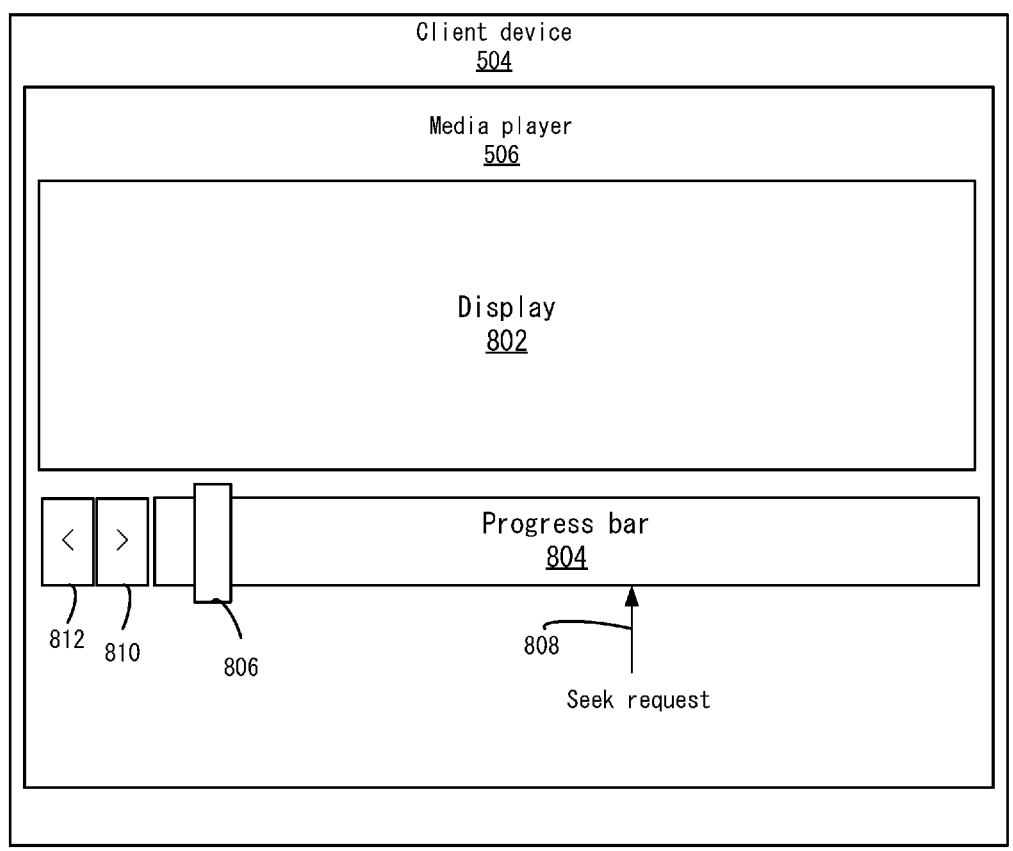
FIG. 8 depicts a more detailed example of a media player according to one embodiment.

FIG. 8 depicts a more detailed example of media player 506 according to one embodiment. A display 802 displays the content of the video. Further, a progress bar 804 displays the progress of the video. For example, a progress indicator 806 indicates the current progress of the video. A user may perform a seek request using different ways. For example, at 808, the user may select progress bar 804 to seek to a position in the video corresponding to that point on progress bar 804. In another embodiment, a user may use control 810 to seek in the forward direction and control 812 to seek in the reverse direction. Different speeds may be used, such as the user may fast-forward or rewind via different speeds.

Figure 9A:
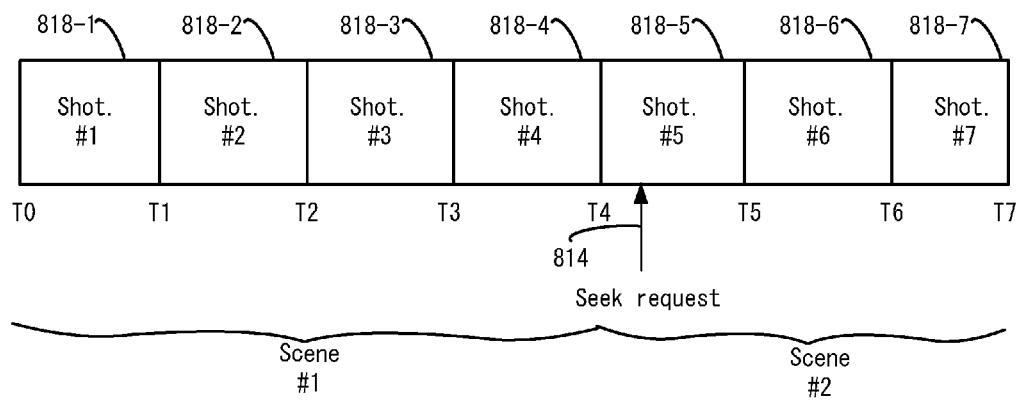
FIG. 9A shows an example for determining the boundary according to one embodiment.

FIG. 9A shows an example for determining the boundary according to one embodiment. If the seek request is at point 808 as shown in FIG. 8 on the progress bar, this point may be shown at 814 in a sequence of shots 818-1 to 818-7. A first scene #1 is located from shots 1-4 and a second scene #2 is located from shots 5-7. At 814, if the seek request is received here, media player 506 may determine that the best context for this seek time is close to the beginning of scene #2 such that the beginning of scene #2 should be requested. In this case, seek processor 702 determines that time T4 should be used to request a segment.

Figure 9B:
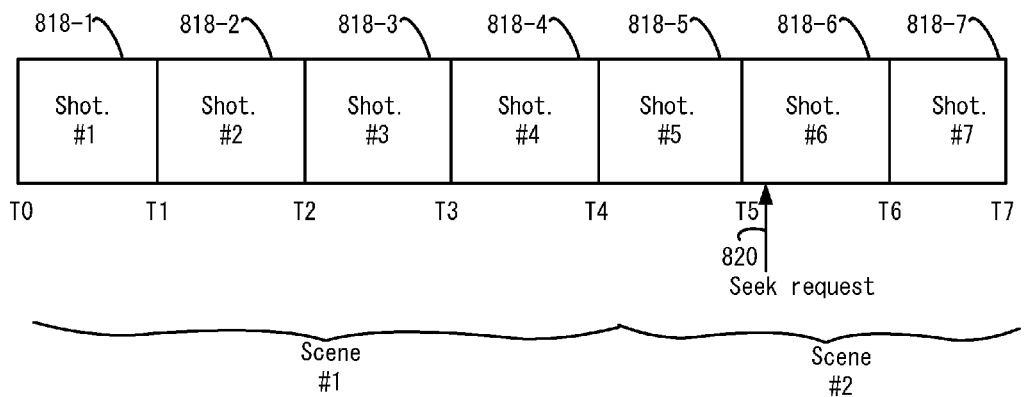
FIG. 9B shows another example for determining the boundary according to one embodiment.

FIG. 9B shows another example for determining the boundary according to one embodiment. In this case, at 820, the seek request is received. This seek request is at a shot #6 and in the middle of scene #2. In this case, seek processor 702 may determine that the best context is the beginning of shot #7. In this case, seek processor 702 determines time T5 as the method for requesting the next segment.

Figure 9C:
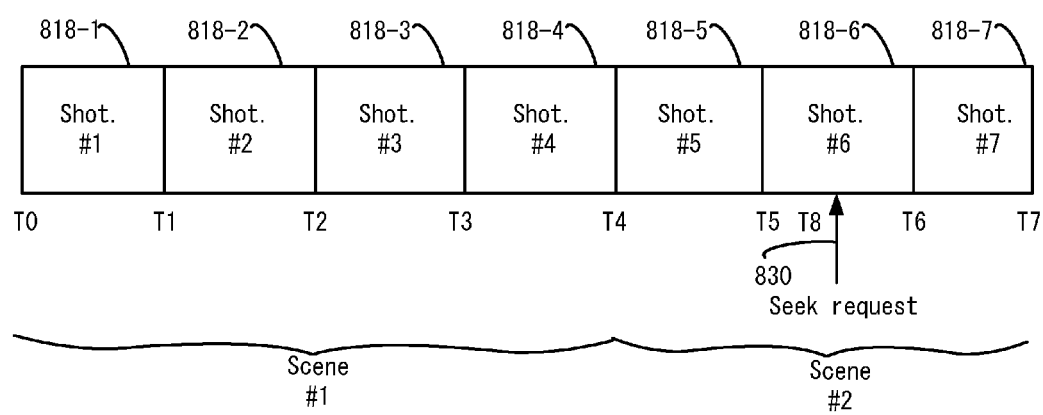
FIG. 9C shows an example of using dialogue to determine the boundary according to one embodiment.

FIG. 9C shows an example of using dialogue to determine the boundary according to one embodiment. At 830, the request is received in the middle of scene #2 and in the middle of shot #6. In this case, seek processor 702 determines that the beginning of the dialogue close to the point at 830 would provide the best context. In this case, the time for the dialogue at T8 is used.

Saving Seek Progress

Figure 10:
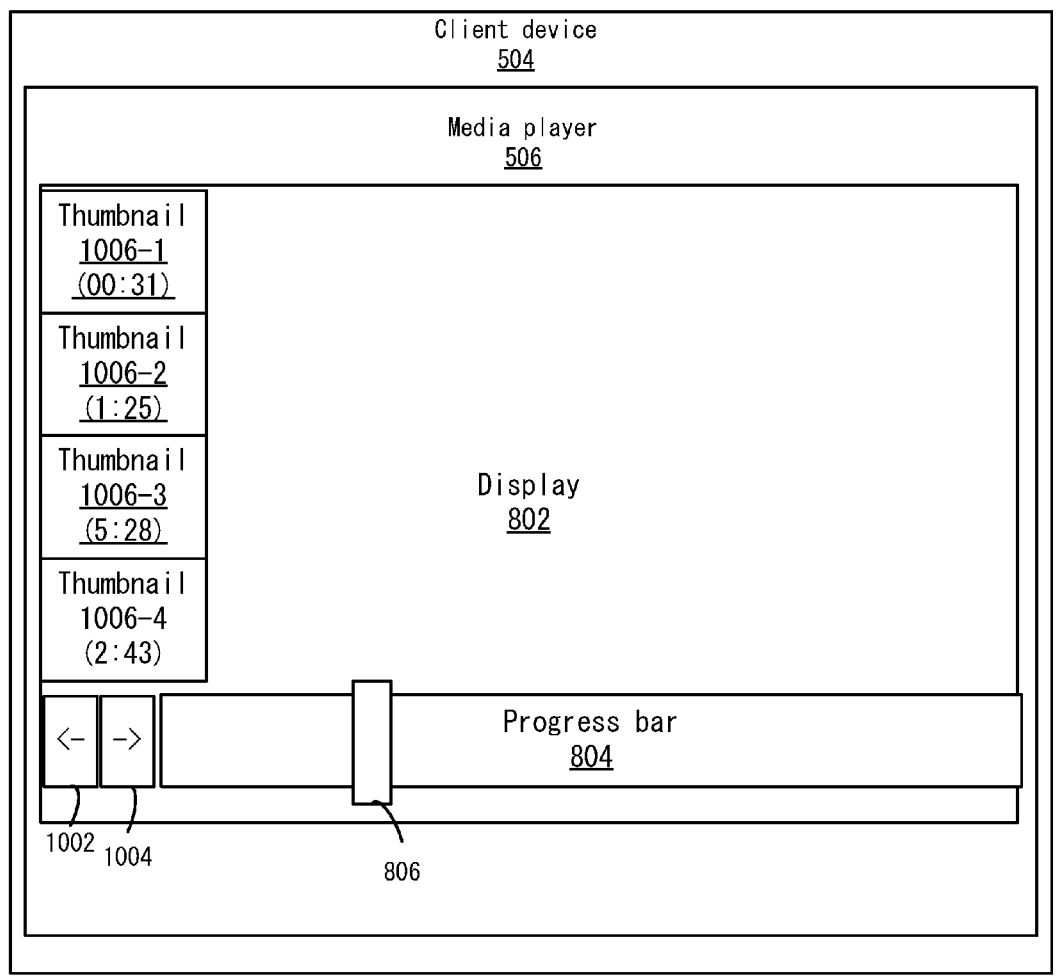
FIG. 10 depicts an example of the media player according to one embodiment.

When a user seeks to different seek times in the video, the user may decide that a prior seek time was more desirable. Typically, a user would have to perform another seek request on the progress bar to try to get back to a previous seek point. However, it would be very difficult for the user to select the progress bar at the same exact point as a previous seek request. Accordingly, particular embodiments may save prior seek requests and provide the user a way to navigate back to prior seek points. This requires altering the media player to allow the user to navigate back to a previous seek time. FIG. 10 depicts an example of media player 506 according to one embodiment. Again, media player 506 includes progress bar 804. Additionally, seek controls 1002 and 1004 allow a user to navigate prior seek times.

A user may review the previous seek requests using seek controls 1002 and 1004. A series of thumbnails 1006-1-1006-4 are shown in media player 506 for previous seek requests. The seek requests are for different times shown as 00:31 seconds, 1:25 minutes, 5:28 minutes, and 2:43 minutes. A user can display these seek requests by hovering over seek controls 1002 and 1004, or by other means, such as selecting a dedicated control (not shown) to display thumbnails 1006. A user can use reverse seek control 1002 to select prior seek requests. Forward seek control 1004 can be used to select seek times in the forward direction. For example, the user may move backwards or forwards in the available thumbnails 1006. To select one of the prior seek request points, the user may double-click on one of the thumbnails 1006 or press the play button while one of the thumbnails 1006 is selected.

In one embodiment, the thumbnails 1006 each show a thumbnail from a seek time. Although the user may have selected a seek time on progress bar 804, the thumbnail may not be exactly for that seek time. For example, seek processor 702 may change the seek time to the boundary as discussed above. In one example, for thumbnail 1006-1, the seek time may have been at 00:34 seconds. However, the thumbnail shown is at 00:31 seconds, which may be the beginning of a scene, shot, or dialogue. By displaying a thumbnail from the boundary rather than the requested seek time, the user may be shown a thumbnail from the beginning of the scene, shot, or dialogue. This may allow the user to better select one of the prior seek requests to go back to as this thumbnail may include content that provides a better context.

Figure 11:
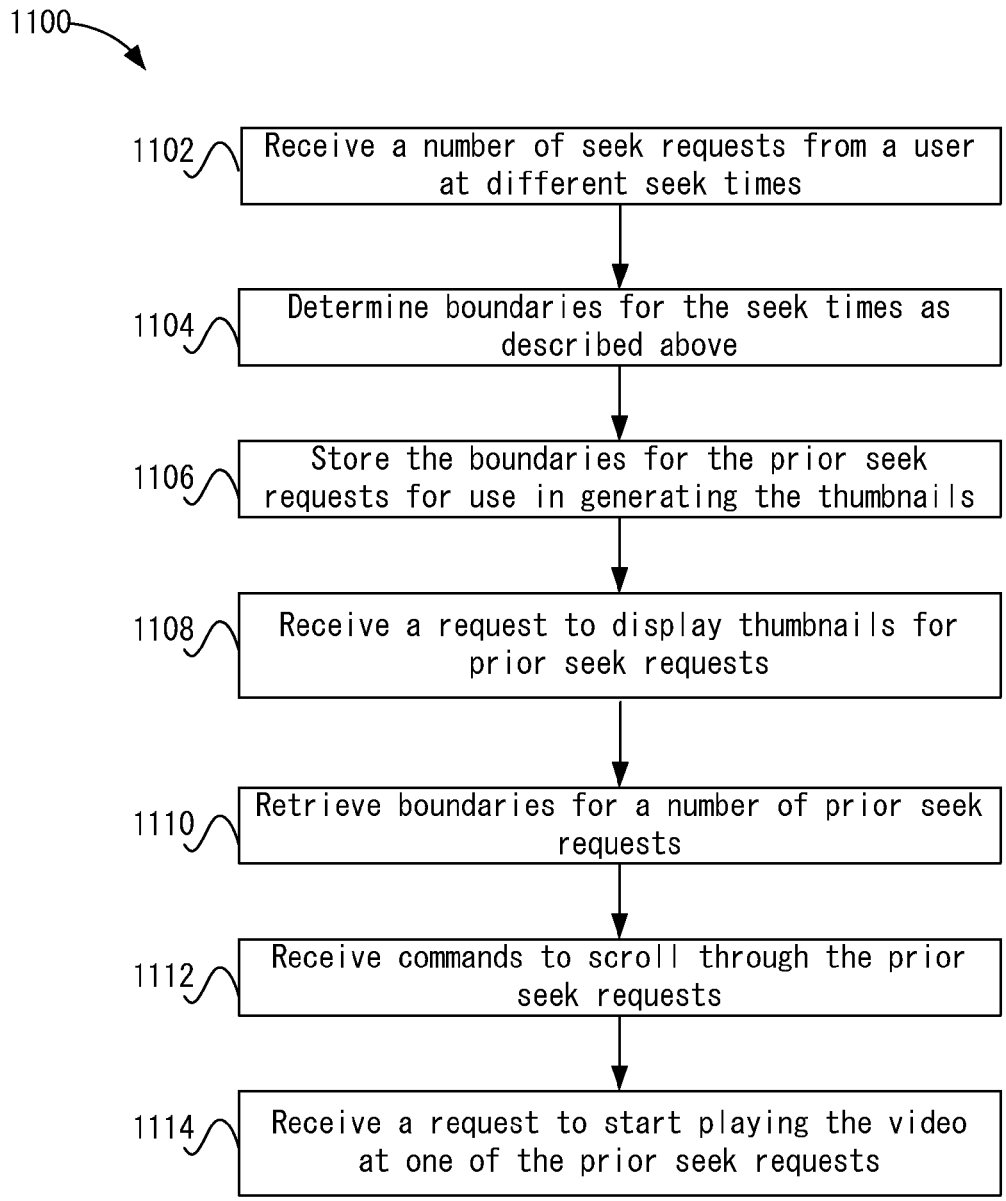
FIG. 11 depicts a simplified flowchart for providing access to prior seek requests according to one embodiment.

FIG. 11 depicts a simplified flowchart 1100 for providing access to prior seek requests according to one embodiment. At 1102, media player 506 receives a number of seek requests from a user at different seek times. At 1104, seek processor 702 determines boundaries for the seek times as described above. The boundaries for the seek request may be determined differently based on the seek times, such as by scene, by shot, or by dialogue.

At 1106, seek processor 702 stores the boundaries for the prior seek requests for use in generating the thumbnails 1006. At 1108, media player 506 receives a request to display thumbnails 1006 for prior seek requests.

At 1110, seek processor 702 retrieves boundaries for a number of prior seek requests. For example, boundaries for the last five seek requests may be retrieved. In other embodiments, all prior seek requests may be retrieved but only a certain number may be displayed on media player 506. The user may then scroll through all of the prior seek requests.

At 1112, media player 506 receives commands to scroll through the prior seek requests. Then, at 1114, media player 506 receives a request to start playing the video at one of the prior seek requests.

Accordingly, particular embodiments receive seek requests from users at seek times. Then, particular embodiments determine a boundary based on various video characteristics that can start the video at a time that provides a better flow or context for the user when performing the seek.

Figure 12:
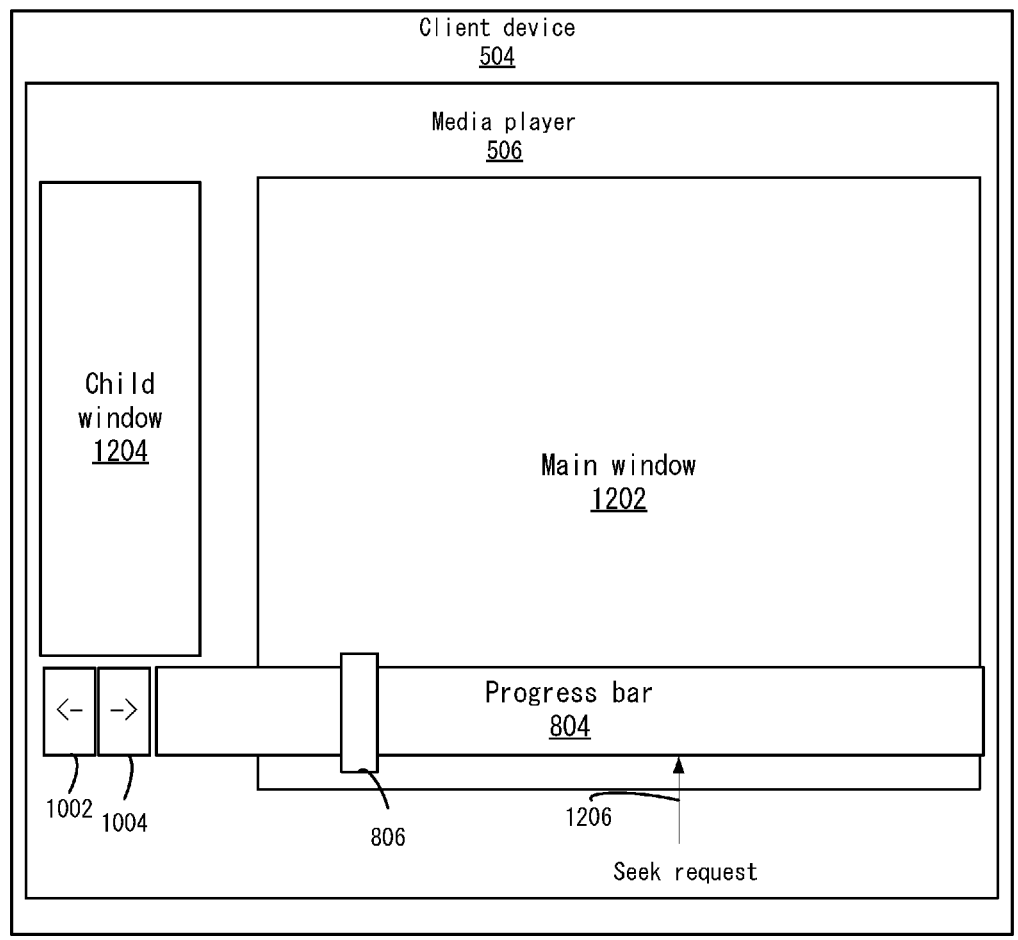
FIG. 12 shows an example of the media player using a child window according to one embodiment.

Particular embodiments may also provide a child window for a user to see the seek progress. FIG. 12 shows an example of media player 506 using a child window according to one embodiment. Media player 506 includes a main window 1202 that is playing the video. When a seek is performed at 1206, a child window 1204 may be generated. Child window 1204 then shows the video while seeking. This may preserve the current progress of the video in main window 1202. For example, the video in main window 1202 is paused while the seeking is performed.

The user may then view the seek progress in window 1202. When the user is satisfied with the seek progress to a different location, the user can cause the video to start playing in main window 1202 at the seek position in child window 304. For example, the user may select child window 1204 or provide another input that causes the video at the time of the seek progress in child window 1204 to start in main window 1202. In one embodiment, main window 1202 and child window 1204 may be receiving separate streams of the video. When the switch occurs, the stream associated with child window 1204 may be associated with main window 1202. In other embodiments, if the user does not wish to seek to a new position, the user may keep the current progress in main window 1202 where the video continues to play from the paused state.

System Overview

Figure 13:
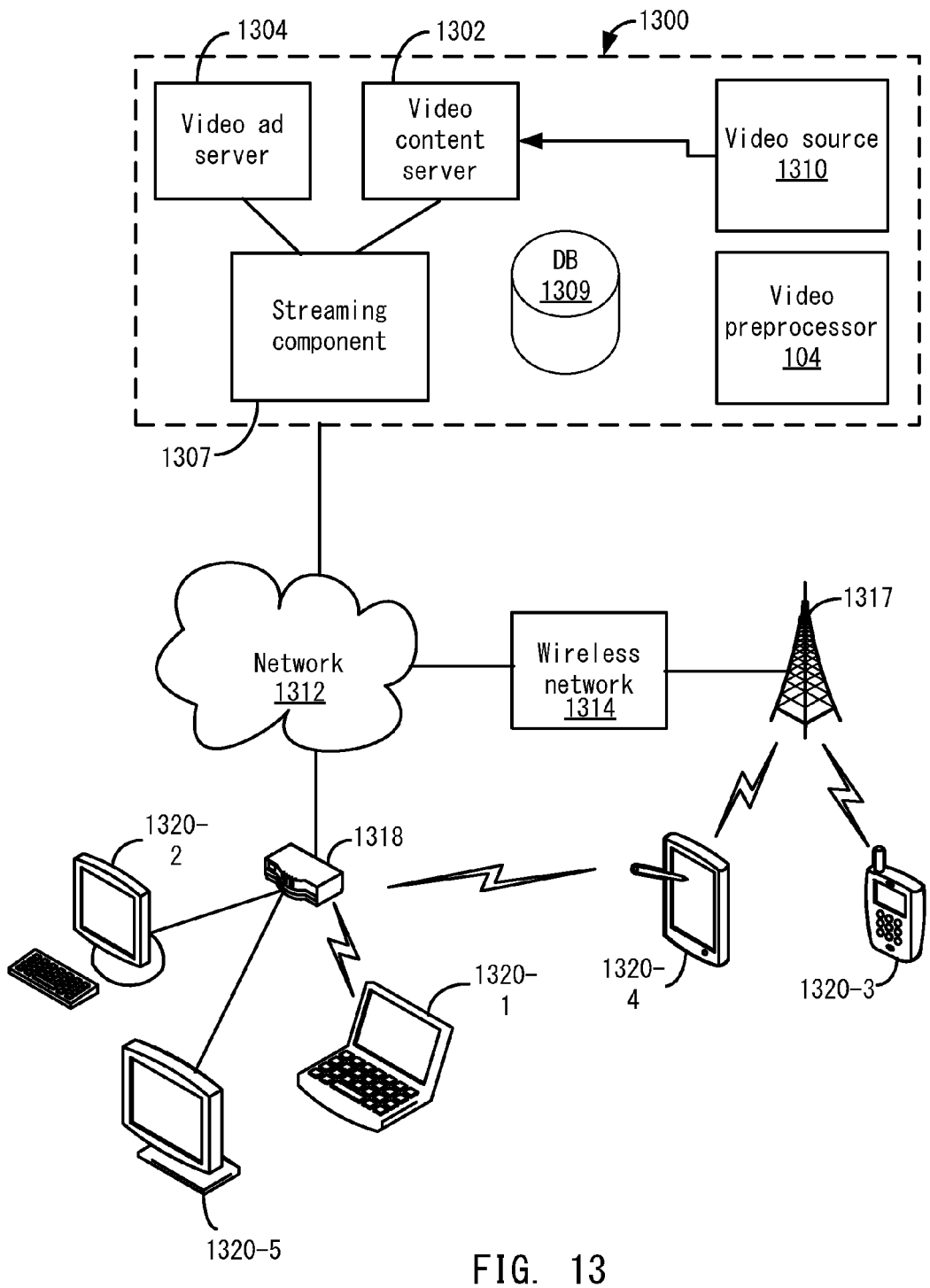
FIG. 13 depicts a video streaming system in communication with multiple client devices via one or more communication networks according to one embodiment.

Features and aspects as disclosed herein may be implemented in conjunction with a video streaming system 1300 in communication with multiple client devices via one or more communication networks as shown in FIG. 13. Aspects of the video streaming system 1300 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 1300, video data may be obtained from one or more sources for example, from a video source 1310, for use as input to a video content server 1302. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1300 may include one or more computer servers or modules 1302, 1304, and/or 1307 distributed over one or more computers. Each server 1302, 1304, 1307 may include, or may be operatively coupled to, one or more data stores 1309, for example databases, indexes, files, or other data structures. A video content server 1302 may access a data store (not shown) of various video segments. The video content server 1302 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1304 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 1300, a public service message, or some other information. The video advertising server 1304 may serve the video advertising segments as directed by a user interface controller (not shown).

The video streaming system 1300 also may include video pre-processor 104.

The video streaming system 1300 may further include an integration and streaming component 1307 that integrates video content and video advertising into a streaming video segment. For example, streaming component 1307 may be a content server or streaming media server. A controller (not shown) may determine the selection or configuration of advertising in the streaming video based on any suitable algorithm or process. The video streaming system 1300 may include other modules or units not depicted in FIG. 13, for example administrative servers, commerce servers, network infrastructure, advertising selection engines, and so forth.

The video streaming system 1300 may connect to a data communication network 1312. A data communication network 1312 may comprise a local area network (LAN), a wide area network (WAN), for example, the Internet, a telephone network, a wireless cellular telecommunications network (WCS) 1314, or some combination of these or similar networks.

One or more client devices 1320 may be in communication with the video streaming system 1300, via the data communication network 1312 and/or other network 1314. Such client devices may include, for example, one or more laptop computers 1320-1, desktop computers 1320-2, "smart" mobile phones 1320-3, tablet devices 1320-4, network-enabled televisions 1320-5, or combinations thereof, via a router 1318 for a LAN, via a base station 1317 for a wireless telephony network 1314, or via some other connection. In operation, such client devices 1320 may send and receive data or instructions to the system 1300, in response to user input received from user input devices or other input. In response, the system 1300 may serve video segments and metadata from the data store 1309 responsive to selection of media programs to the client devices 1320. Client devices 1320 may output the video content from the streaming video segment in a media player using a display screen, projector, or other video output device, and receive user input for interacting with the video content.

Distribution of audio-video data may be implemented from streaming component 1307 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1307 may communicate with client device 1320 using control messages and data messages to adjust to changing network conditions as the video is played. These control messages can include commands for enabling control functions such as fast forward, fast reverse, pausing, or seeking to a particular part of the file at the client.

Since streaming component 1307 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1307 may use TCP-based protocols, such as HTTP and Real Time Messaging Protocol (RTMP). Streaming component 1307 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 14:
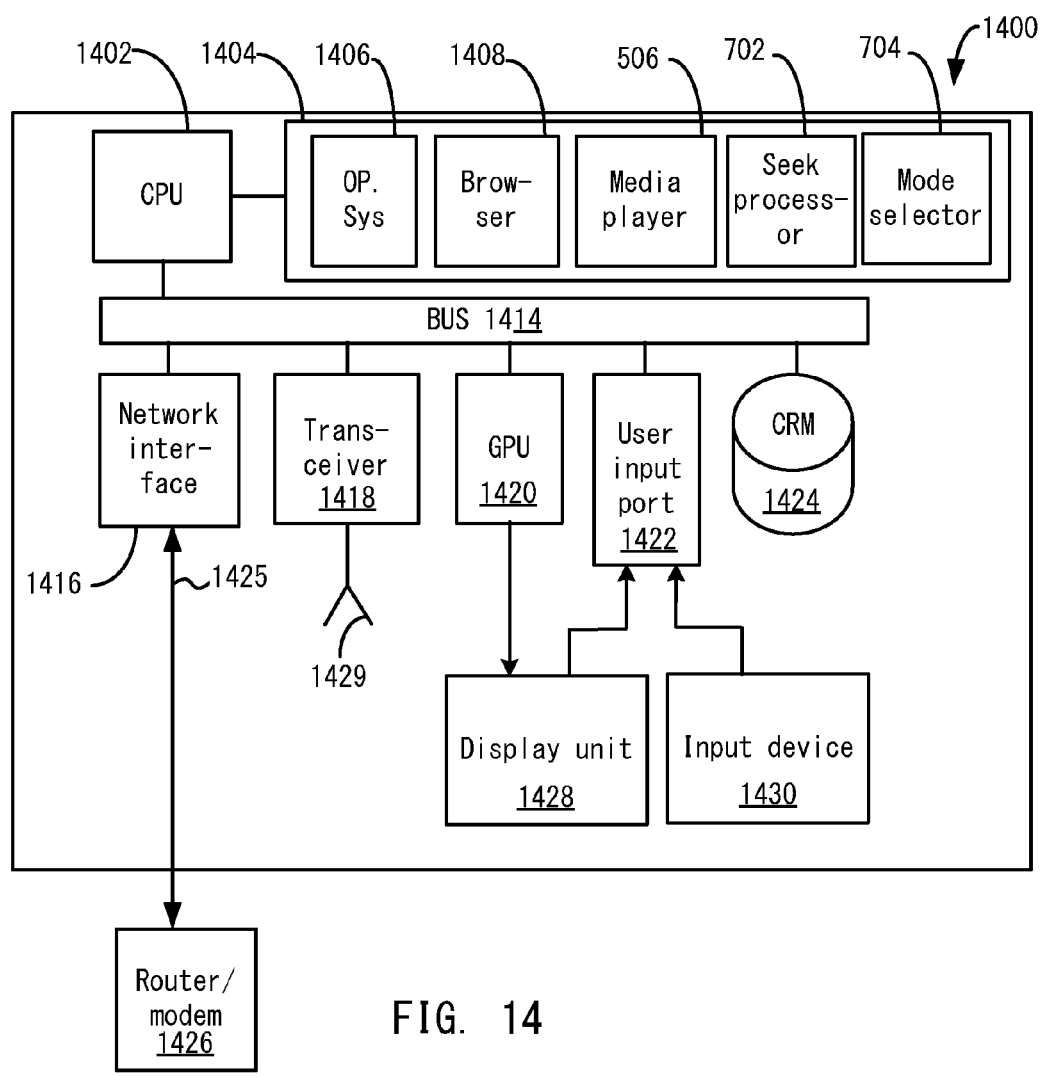
FIG. 14 depicts a diagrammatic view of an apparatus for viewing video content.

Referring to FIG. 14, a diagrammatic view of an apparatus 1400 for viewing video content and advertisements is illustrated. In selected embodiments, the apparatus 1400 may include a processor (CPU) 1402 operatively coupled to a processor memory 1404, which holds binary-coded functional modules for execution by the processor 1402. Such functional modules may include an operating system 1406 for handling system functions such as input/output and memory access, a browser 1408 to display web pages, and media player 506 for playing video. The modules may further include seek processor 1404 and mode selector 1406. The memory 1404 may hold additional modules not shown in FIG. 14, for example modules for performing other operations described elsewhere herein.

A bus 1414 or other communication component may support communication of information within the apparatus 1400. The processor 1402 may be a specialized or dedicated microprocessor configured to perform particular tasks in accordance with the features and aspects disclosed herein by executing machine-readable software code defining the particular tasks. Processor memory 1404 (e.g., random access memory (RAM) or other dynamic storage device) may be connected to the bus 1414 or directly to the processor 1402, and store information and instructions to be executed by a processor 1402. The memory 1404 may also store temporary variables or other intermediate information during execution of such instructions.

A computer-readable medium in a storage device 1424 may be connected to the bus 1414 and store static information and instructions for the processor 1402; for example, the storage device (CRM) 1424 may store the modules 1406, 1408, 1410 and 1412 when the apparatus 1400 is powered off, from which the modules may be loaded into the processor memory 1404 when the apparatus 1400 is powered up. The storage device 1424 may include a non-transitory computer-readable storage medium holding information, instructions, or some combination thereof, for example instructions that when executed by the processor 1402, cause the apparatus 1400 to be configured to perform one or more operations of a method as described herein.

A communication interface 1416 may also be connected to the bus 1414. The communication interface 1416 may provide or support two-way data communication between the apparatus 1400 and one or more external devices, e.g., the streaming system 1300, optionally via a router/modem 1426 and a wired or wireless connection. In the alternative, or in addition, the apparatus 1400 may include a transceiver 1418 connected to an antenna 1429, through which the apparatus 1400 may communicate wirelessly with a base station for a wireless communication system or with the router/modem 1426. In the alternative, the apparatus 1400 may communicate with a video streaming system 1300 via a local area network, virtual private network, or other network. In another alternative, the apparatus 1400 may be incorporated as a module or component of the system 1300 and communicate with other components via the bus 1414 or by some other modality.

The apparatus 1400 may be connected (e.g., via the bus 1414 and graphics processing unit 1420) to a display unit 1428. A display 1428 may include any suitable configuration for displaying information to an operator of the apparatus 1400. For example, a display 1428 may include or utilize a liquid crystal display (LCD), touchscreen LCD (e.g., capacitive display), light emitting diode (LED) display, projector, or other display device to present information to a user of the apparatus 1400 in a visual display.

One or more input devices 1430 (e.g., an alphanumeric keyboard, microphone, keypad, remote controller, game controller, camera or camera array) may be connected to the bus 1414 via a user input port 1422 to communicate information and commands to the apparatus 1400. In selected embodiments, an input device 1430 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1428, for example using a touch sensitive screen. A cursor control device may communicate direction information and command selections to the processor 1402 and control cursor movement on the display 1428. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    sending, by a computing device, a request for a video using a media player;
    receiving, by the computing device, a plurality of boundary information sets for the video, the plurality of boundary information sets segmenting the video differently based on different video characteristics and the plurality of boundary information sets are associated with a plurality of seek modes;
    sending, by the computing device, requests for segments of the video;
    receiving, by the computing device, the segments for the video and playing the segments using the media player;
    receiving, by the computing device, a seek request for a seek time in the video;
    determining, by the computing device, a seek mode from the plurality of seek modes to use based on the seek time and two or more boundaries from two or more of the plurality of boundary information sets, wherein the two or more boundaries are associated with two or more scene boundaries, shot boundaries, and dialogue boundaries;
    determining, by the computing device, a segment in the video using the one of the plurality of boundary information sets associated with the determined seek mode, wherein the segment starts at a different time than the seek time; and
    sending, by the computing device, a request for the segment, wherein the media player plays the segment in response to the seek request.

2. The method of claim 1, wherein determining the segment comprises determining a boundary time closest to the seek time in the one of the plurality of boundary information sets, wherein the segment starts at the boundary time.

3. The method of claim 1, wherein determining the segment comprises determining one of the plurality of boundary information sets that is considered a best context for the seek time.

4. The method of claim 1, wherein determining the seek mode comprises:
    analyzing the seek time with respect to nearest boundaries in the plurality of boundary information sets.

5. The method of claim 1, wherein determining the seek mode comprises:
    analyzing a first boundary information set for scenes of the video to determine if the seek time is within a beginning of a first boundary in the first boundary information set to a maximum of the first boundary plus a time or a second boundary in a second boundary information set for shots.

6. The method of claim 5, wherein determining the seek mode comprises:
    analyzing the second boundary information set for shots of the video to determine if the seek time is within a beginning of the second boundary in the second boundary information set to a maximum of the second boundary plus a time or a third boundary in a third boundary information set for dialogue.

7. The method of claim 6, wherein determining the seek mode comprises:
    determining the third boundary in the third boundary information set for dialogue to use to determine the segment.

8. The method of claim 1, wherein the plurality of boundary information sets include a first boundary information set for shots in the video, a second boundary information set for scenes in the video, and a third boundary information set for dialogue in the video.

9. The method of claim 1, wherein:
the video is segmented at different times than the boundaries in the plurality of boundary information sets.

10. The method of claim 1, further comprising:
saving a seek history for a number of previous seek requests at seek times received for the video; and
providing thumbnails for the number of previous seek requests to allow a user to seek to one of the number of previous seek requests.

11. The method of claim 10, wherein:
the seek history changes the seeks times for the number of previous seek requests based on boundaries in at least one of the plurality of boundary information sets.

12. A method comprising:
preprocessing, by a computing device, a video to determine a plurality of boundary information sets for the video, the plurality of boundary information sets segmenting the video differently based on different video characteristics;
receiving, by the computing device, a request for the video from a client device; and
causing, by the computing device, the plurality of boundary information sets to be sent to the client device, wherein the media player plays the video, receives a seek request to a seek time in the video, and uses one of the plurality of boundary information sets to determine a segment of the video to request for playback based on the seek time and two or more boundaries from two or more of the plurality of boundary information sets, wherein the two or more boundaries are associated with two or more of scene boundaries, shot boundaries and dialogue boundaries.

13. The method of claim 12, wherein preprocessing comprises:
processing the video to determine shots boundaries for shots in the video.

14. The method of claim 13, wherein preprocessing comprises:
processing the video to determine scene boundaries for scenes in the video.

15. The method of claim 14, wherein preprocessing comprises:
processing the video to determine dialogue boundaries for dialogue in the video,
wherein the plurality of boundary information sets include a first boundary information set for shot boundaries in the video, a second boundary information set for scene boundaries in the video, and a third boundary information set for dialogue boundaries in the video.

16. The method of claim 15, wherein processing the video to determine dialogue boundaries for the dialogue in the video comprises:
using speaker recognition or text analysis of captions for the video to determine the dialogue boundaries for the dialogue.

17. The method of claim 12, wherein:
the video is segmented at different times than the boundaries in the plurality of boundary information sets.

18. An apparatus comprising:
one or more computer processors; and
a non-transitory computer-readable storage medium comprising instructions, that when executed, control the one or more computer processors to be configured for:
sending a request for a video using a media player;
receiving a plurality of boundary information sets for the video, the plurality of boundary information sets segmenting the video differently based on different video characteristics and the plurality of boundary information sets are associated with a plurality of seek modes;
sending requests for segments of the video;
receiving the segments for the video and playing the segments using the media player;
receiving a seek request for a seek time in the video;
determining a seek mode from the plurality of seek modes to use based on the seek time and two or more boundaries from two or more of the plurality of boundary information sets, wherein the two or more boundaries are associated with two or more of scene boundaries, shot boundaries, and dialogue boundaries;
determining a segment in the video using the one of the plurality of boundary information sets associated with the determined seek mode, wherein the segment starts at a different time than the seek time; and
sending a request for the segment, wherein the media player plays the segment in response to the seek request.

19. The apparatus of claim 18, wherein determining the segment comprises determining a boundary time closest to the seek time in the one of the plurality of boundary information sets, wherein the segment starts at the boundary time.

20. The apparatus of claim 18, wherein the plurality of boundary information sets include a first boundary information set for shots in the video, a second boundary information set for scenes in the video, and a third boundary information set for dialogue in the video.

* * * * *

UNITED STATES PATENT AND TRADEMARK OFFICE
CERTIFICATE OF CORRECTION

PATENT NO. : 9,521,470 B2  
APPLICATION NO. : 14/738425  
DATED : December 13, 2016  
INVENTOR(S) : Tao Xiong et al.

Page 1 of 1

It is certified that error appears in the above-identified patent and that said Letters Patent is hereby corrected as shown below:

In the Claims

In Column 16, Claim 1, Line 22, please insert --of-- after the word more.

Signed and Sealed this
Twenty-eighth Day of February, 2017

Michelle K. Lee
*Director of the United States Patent and Trademark Office*